United States Patent
Bleecher Snyder et al.

(10) Patent No.: US 9,356,819 B2
(45) Date of Patent: May 31, 2016

(54) SYSTEMS AND METHODS FOR CHECKING A USER INTO A LOCATION USING A PACKET SEQUENCE INCLUDING LOCATION INFORMATION

(71) Applicant: EBAY INC., San Jose, CA (US)

(72) Inventors: Joshua Bleecher Snyder, San Francisco, CA (US); Max Edward Metral, Brookline, MA (US)

(73) Assignee: EBAY INC., San Jose, CA (US)

( * ) Notice: Subject to any disclaimer, the term of this patent is extended or adjusted under 35 U.S.C. 154(b) by 87 days.

(21) Appl. No.: 14/039,154

(22) Filed: Sep. 27, 2013

(65) Prior Publication Data

US 2015/0094080 A1 Apr. 2, 2015

(51) Int. Cl.
| | |
|---|---|
| *H04W 64/00* | (2009.01) |
| *H04W 4/04* | (2009.01) |
| *H04L 29/08* | (2006.01) |
| *H04W 4/02* | (2009.01) |
| *H04W 84/18* | (2009.01) |
| *H04W 4/00* | (2009.01) |

(52) U.S. Cl.
CPC ................. *H04L 29/08* (2013.01); *H04W 4/02* (2013.01); *H04W 4/008* (2013.01); *H04W 84/18* (2013.01)

(58) Field of Classification Search
CPC ......... H04W 4/04; H04W 28/06; H04W 4/23; H04W 24/00; H04L 67/303; G06Q 20/20; G01S 1/68
USPC ......... 709/219; 705/75; 340/539.13; 342/450
See application file for complete search history.

(56) References Cited

U.S. PATENT DOCUMENTS

| | | | |
|---|---|---|---|
| 6,587,835 | B1 | 7/2003 | Treyz et al. |
| 6,711,474 | B1 | 3/2004 | Treyz et al. |
| 8,090,616 | B2 | 1/2012 | Proctor, Jr. et al. |
| 8,135,624 | B1 | 3/2012 | Ramalingam et al. |
| 8,346,672 | B1 | 1/2013 | Weiner et al. |
| 8,856,045 | B1 | 10/2014 | Patel et al. |
| D717,309 | S | 11/2014 | Govindarajan |
| 8,972,296 | B2 | 3/2015 | Govindarajan et al. |
| 2003/0004743 | A1 | 1/2003 | Callegari |
| 2003/0191818 | A1* | 10/2003 | Rankin et al. ............. 709/219 |
| 2004/0243519 | A1* | 12/2004 | Perttila et al. ............. 705/75 |
| 2007/0235519 | A1 | 10/2007 | Jang et al. |
| 2008/0096579 | A1* | 4/2008 | Gill ............................. 455/456.1 |
| 2008/0280624 | A1* | 11/2008 | Wrappe ...................... 455/456.1 |

(Continued)

FOREIGN PATENT DOCUMENTS

WO WO 2010/109271 A1 9/2010

OTHER PUBLICATIONS

PCT International Search Report and the Written Opinion mailed Jan. 3, 2014, in International Application No. PCT/US2013/059413.

(Continued)

*Primary Examiner* — William Nealon
(74) *Attorney, Agent, or Firm* — Haynes & Boone, LLP

(57) ABSTRACT

Systems and methods are disclosed which may allow a user having a mobile device to check in to a location using a packet sequence that includes information for identifying the location transmitted by one or more Bluetooth® Low Energy (BLE) beacons at or near the location. The user may be able to store packet sequences for various locations that may allow the user to automatically check into these locations using the store packet sequences.

20 Claims, 9 Drawing Sheets

(56) References Cited

U.S. PATENT DOCUMENTS

| | | |
|---|---|---|
| 2009/0327135 A1 | 12/2009 | Nguyen et al. |
| 2010/0063867 A1 | 3/2010 | Proctor, Jr. et al. |
| 2010/0082481 A1 | 4/2010 | Lin et al. |
| 2011/0010291 A1 | 1/2011 | Adams |
| 2011/0021142 A1 | 1/2011 | Desai et al. |
| 2012/0050098 A1* | 3/2012 | Kuehnel et al. .......... 342/357.31 |
| 2012/0150669 A1 | 6/2012 | Langley et al. |
| 2012/0166337 A1 | 6/2012 | Park et al. |
| 2012/0254029 A1 | 10/2012 | Layne et al. |
| 2012/0258669 A1 | 10/2012 | Honkanen et al. |
| 2012/0265623 A1 | 10/2012 | Zhu et al. |
| 2013/0065584 A1* | 3/2013 | Lyon et al. .................... 455/434 |
| 2013/0099920 A1 | 4/2013 | Song et al. |
| 2013/0106684 A1 | 5/2013 | Weast et al. |
| 2013/0109323 A1 | 5/2013 | Ruutu et al. |
| 2013/0166399 A1 | 6/2013 | Awad |
| 2013/0225197 A1* | 8/2013 | McGregor et al. ......... 455/456.1 |
| 2013/0251216 A1 | 9/2013 | Smowton et al. |
| 2013/0273906 A1 | 10/2013 | Cucala Garcia et al. |
| 2014/0001264 A1 | 1/2014 | Babu et al. |
| 2014/0108241 A1 | 4/2014 | Tunnell et al. |
| 2014/0114780 A1 | 4/2014 | Menefee et al. |
| 2014/0172700 A1 | 6/2014 | Teuwen et al. |
| 2014/0188733 A1 | 7/2014 | Granbery |

OTHER PUBLICATIONS

Research and markets: The future of mobile payments 2012. (May 16, 2012). M2 Presswire Retrieved Oct. 20, 2014.

PCT International Search Report and the Written Opinion mailed Dec. 2, 2014, in related International Application No. PCT/US2014/053289.

* cited by examiner

SYSTEMS AND METHODS FOR CHECKING A USER INTO A LOCATION USING A PACKET SEQUENCE INCLUDING LOCATION INFORMATION

BACKGROUND

1. Technical Field

Embodiments disclosed herein are related to systems and methods for checking a user into a location using a specific sequence of packets that may include information identifying the location.

2. Related Art

Due to the increase in use of mobile devices and the improved networking and online capabilities of these mobile devices, merchants having physical "brick and mortar" storefronts may also have mechanisms for delivering advertisements and other information to the mobile devices while a user of the mobile device is in the merchant store. Some merchants may take advantage of platforms and services that allow a user to check in to the merchant or other location that they are in to deliver advertisements, specials, and other information. This allows the merchant to know that the user is at the store and provide specials and other information to the user. If the user is checking in via a social network, the user may also provide feedback about the merchant which may be useful or helpful for the merchant. If the user is checking in via a payment processing service, such as provided by PayPal, Inc. or San Jose, Calif., the user may be provided with options for selecting, ordering, and paying for items through the payment processing service when checking in, providing convenience for both the user and the merchant. In theory, checking provides benefits for both the user and the merchant. However, the users may have to perform the tedious process of checking in every time that they visit the merchant. And, if the user does not check in on every visit, then neither the user nor the merchant are fully benefits from checking in.

Figure 1:
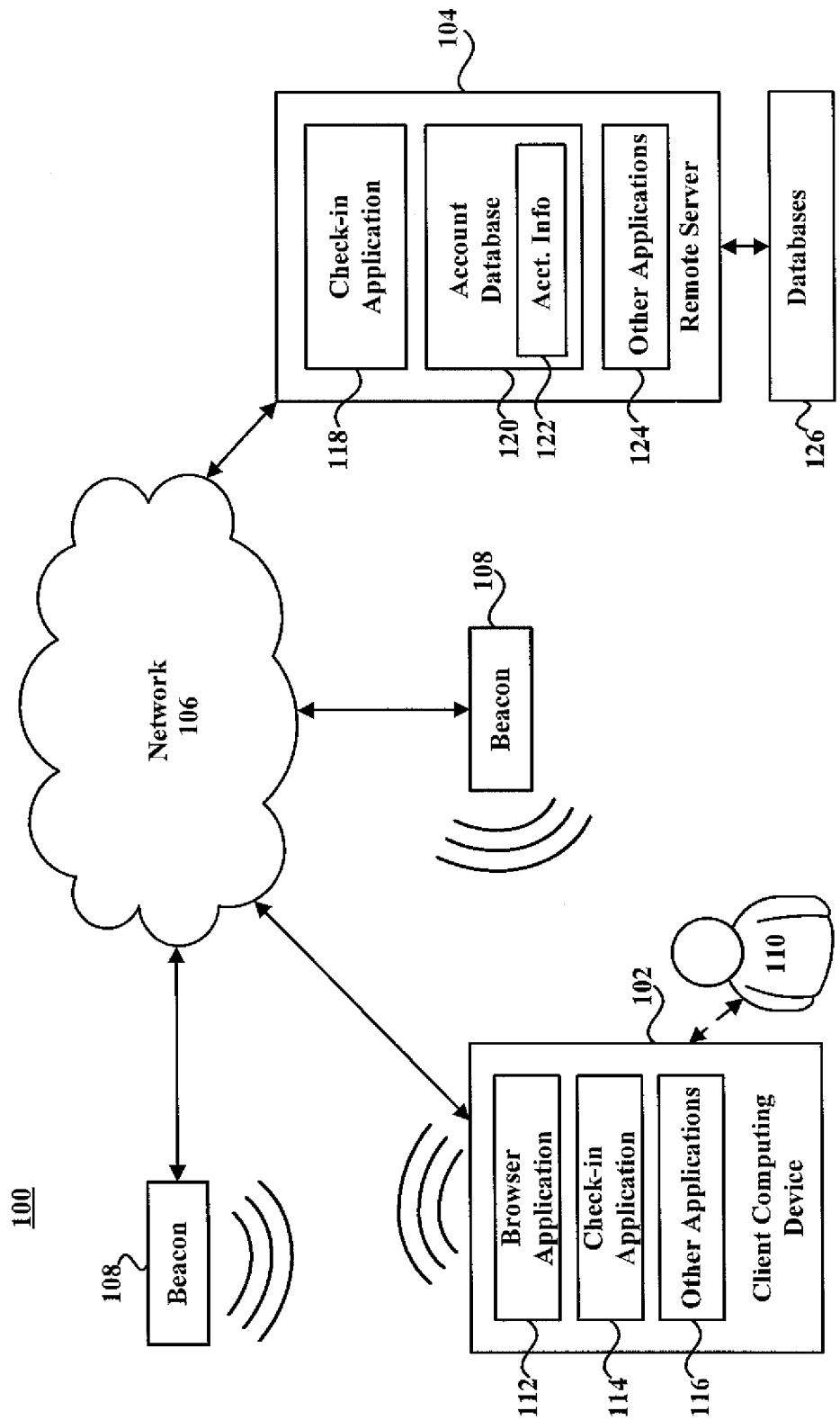
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

There is a need for providing systems and methods for checking a user in when the user is visiting the merchant's physical storefront.

Consistent with some embodiments, there is provided a system. The system includes a wireless transceiver configured to receive a packet sequence sent according to a Bluetooth® low energy (BLE) protocol, the packet sequence including information identifying a location. The system also includes a network interface component configured to send a check in request including the received packet sequence. The system further includes one or more processors configured to generate the check in request, and a memory configured to store the received packet sequence.

Consistent with some embodiments, there is further provided a method including receiving a packet sequence sent according to a Bluetooth® low energy (BLE) protocol, the packet sequence including information identifying a location, sending a check in request to check in to the location when the received packet sequence matches a stored packet sequence specific to the location, receiving the packet sequence specific to the location when the received packet sequence does not match a stored packet sequence specific to the location, the received packet sequence specific to the location being received over a network, and storing the received packet sequence specific to the location. The method may also be embodied in computer-readable media.

Embodiments consistent with this disclosure may allow a merchant to use low power transmitting devices to transmit a timed sequence that may be used to automatically check a user into a merchant or other location. These and other embodiments will be described in further detail below with respect to the following figures.

FIG. 1 is a block diagram of a networked system 100, consistent with some embodiments. System 100 includes a client computing device 102 and a remote server 104 in communication over a network 106. Remote server 104 may be a payment service provider server that may be maintained by a payment provider, such as PayPal, Inc. of San Jose, Calif. Remote server 104 may be maintained by other service providers in different embodiments. Remote server 104 may also be maintained by an entity with which sensitive credentials and information may be exchanged with client computing device 102. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

As shown in FIG. 1, system 100 may include one or more beacons 108 that may be in communication with network 106. In some embodiments, beacons 108 may be installed at a merchant location, such as a brick and mortar or physical storefront of the merchant. In some embodiments, beacons 108 may be Bluetooth™ Low Energy (BLE) beacons. BLE is a technology that transmits information at a frequency of about 2.4 GHz (about 2042-2480 MHz) over forty (40) 2-MHz wide channels, and has a range of about 50 meter or about 160 feet. Information transmitted according to the BLE protocol may be transmitted at a rate of about 1 Mbit/s with an application throughput of about 0.27 Mbit/s. In some embodiments, BLE communications may be secured using 128-bit Advanced Encryption Standard (AES) encryption with counter mode with a cipher block chaining message authentication code (CBC-MAC) and user defined security. Further, in some embodiments, BLE communications may utilize adaptive frequency hopping, lazy acknowledgement, a 24-bit cyclic redundancy check (CRC) and 32-bit message integrity check for robustness. Moreover, in some embodiments, BLE-capable devices may consume a fraction of the power of standard Bluetooth® devices due to the protocol allowing low duty cycles, and being designed for applications that may not require continuous data transfer. Beacons 108 may transmit one or more sequences of information such that when a device such as client computing device 102 capable of receiving information from beacons 108 comes within the range of a beacon 108, the device may receive a transmission from a beacon 108 and be instructed to perform an action, such as display an advertisement or check in to a location or merchant using one or more platforms or services capable of receiving and processing check ins. As used herein, location may refer to a merchant physical storefront, including restaurants, department stores, home improvement stores, cafés, and the like, and may also refer to a place, landmark, or museum, and generally any location to which user 110 may check in to for the purposes of identifying themselves as being at the location and receiving any information, specials, offers, promotions, payment options, and other features associated with the location that are accessible once user 110 has checked-in. In some embodiments, a location may be any place where beacon 108 may be used to automatically check user 110 in to the location.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. In some embodiments, the instructions may be executed by the one or more processors in response to interaction by user 110. For example, such instructions may include browser application 112 such as a mobile browser application, which may be used to provide a user interface to permit user 110 to browse information available over network 106, including information hosted by remote server 104. For example, browser application 112 may be implemented as a web browser to view information available over network 106. Browser application 112 may include a graphical user interface (GUI) that is configured to allow user 110 to interface and communicate with remote server 104 or other servers managed by content providers or merchants via network 106. For example, user 110 may be able to access websites to find and purchase items, as well as access user account information or web content.

Client computing device 102 may also include a check in application 114 that may allow user 110 to check in to a location using a check in platform or service such as may be provided by PayPal, Inc. of San Jose, Calif., Foursquare of New York, N.Y., Facebook, Inc., of Menlo Park, Calif., or Google+ of Google, Inc. of Mountain View, Calif., and implemented by remote server 104. In some embodiments, check in application may include multiple application programming interfaces (APIs) for checking in to one or more of the check in platforms or services.

In some embodiments, checking in to a location while visiting a location such as a merchant physical storefront may provide user with exclusive deals, offers, or may allow user to purchase and pay for items. In some embodiments, user 110 may check in to a location, such as a merchant location to access additional information about the location or merchant. For example, upon checking in, user 110 may be able to view and review product information about products that are offered at the location. As another example, user 110 may be able to see an inventory of products that are currently in stock at the location upon checking in. In such embodiments, the product inventory may be provided by Milo of San Jose, Calif. Checking in may provide user 110 with additional social options. For example, user 110 may be presented with a list of other users, colleagues, acquaintances, contacts, and the like that are also checked in to the location or a nearby location. In some embodiments, user 110 may opt-in or opt-out of such features.

As noted previously, upon checking in, user 110 may receive information, specials, offers, promotions, payment options, and other features associated with the location that are accessible once user 110 has checked-in. In some embodiments, user 110 may be able to browse through available information, specials, offers, promotions, payment options, and other features associated with the location once user 110 has checked in, and then select those features that user 110 wants to use and/or save to client computing device 102. For example, user 110 may browse available offers or coupons upon checking in and then download those that are of interest to user to client computing device 102 for use while user 110 is at the location.

Client computing device 102 may include other applications 116 as may be desired in one or more embodiments to provide additional features available to user 110, including accessing a user account with remote server 104. For example, applications 116 may include interfaces and communication protocols that allow the user to receive and transmit information through network 106 and to remote server 104 and other online sites. Applications 116 may also include security applications for implementing client-side security features, programmatic client applications for interfacing with appropriate APIs over network 106 or various other types of generally known programs and/or applications. Applications 116 may include mobile applications downloaded and resident on client computing device 102 that enables user 110 to access content through the applications.

Remote server 104, according to some embodiments, may be maintained by a service that processes check ins so that a proprietor of a location, such as a merchant, or others know that user 110 is at the location. Remote server 104 may also be capable of providing access to a merchant's goods and services (collectively referred to as "items") that are for purchase and may provide a payment service processing for the purchased items. Remote server 104 may include at least check in application 118, which may be configured to interact with client computing device 102 connected to network 106 and beacon 108 connected to network 106 to check user 102 in to a location. In some embodiments, checking client computing device 102 in to a location may allow user 110 and client computing device 102, to access features, specials, offers, and the like offered by the location. In some embodiments, these features, specials, offers, and the like may be provided and processed by remote server 104 on behalf of the location.

Remote server 104 may also include an account database 120 that includes account information 122 for users having an account on remote server 104, such as user 110. In some embodiments, check in application 118 may check user 110 and client computing device 102 in to a location based on information in account information 122 of account database 120. Account information 122 may include information about user 110 that may be sent to the location or merchant when user 110 is checked in to that location, based on preferences of user 110 or opting in or out of such features. For example, when user 110 checks in to a location, check in application 118 may retrieve information about user 110 to provide to the location or merchant, such as a photograph or picture of user 110, an identity of user 110 stored in account information 122 and a frequency or recentness of a last check in at the location or nearby locations. Additional information of user 110 from account information 122 may also be provided to the location or merchant upon a successful check in by user 110. The additional information may include preferences and favorite items of user 110 at the location or other locations, past purchases made by user 110 at the location or nearby locations. The additional information may include known measurements or sizes worn by user 110 if user 110 is checking in to a clothing or shoe store. In some embodiments, account information may also include some financial information related to user 110, such as how much user 110 has spent at similar locations, how much funds user 110 has in their account associated with remote server 104, and a creditworthiness of user 110. Further information may also be shared with the merchant or location upon a check in. In some embodiments, user 110 may be able to determine and select what information may be shared with a merchant or location upon a check in.

Remote server 104 may include other applications 124 and may also be in communication with one or more external databases 126, that may provide additional information that may be used by remote server 104. In some embodiments, databases 126 may be databases maintained by third parties, and may include third party account information of user 110.

Although discussion has been made of applications and, applications on client computing device 102 and remote server 104, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
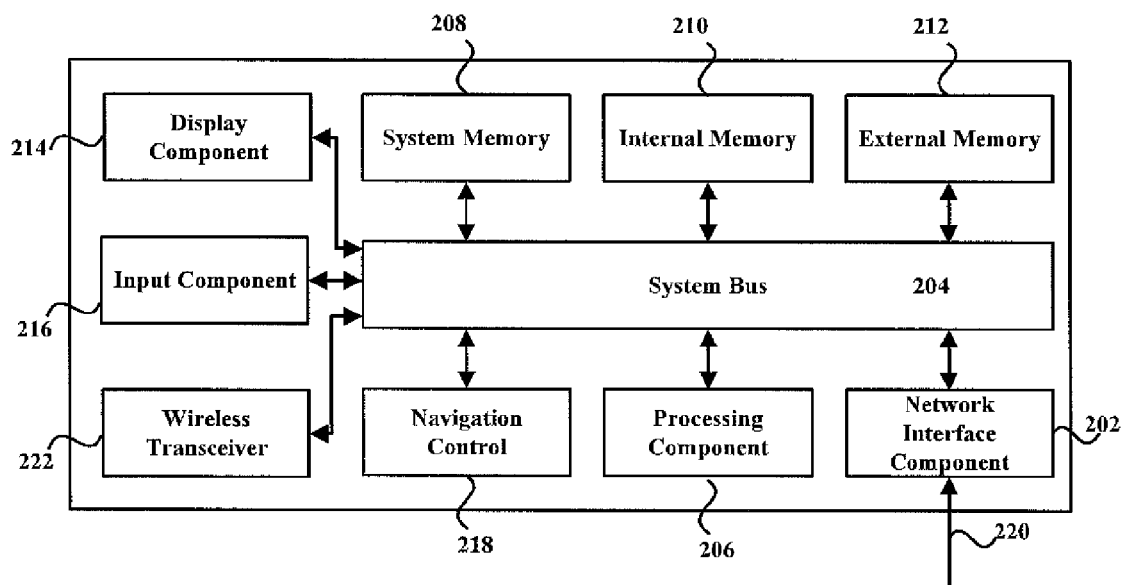
FIG. 2 is a diagram illustrating a computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 108. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 108.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs), a system memory component 208, which may correspond to random access memory (RAM), an internal memory component 210, which may correspond to read-only memory (ROM), and an external or static memory 212, which may correspond to optical, magnetic, or solid-state memories. Consistent with some embodiments, computing system 200 further includes a display component 214 for displaying information to a user 120 of computing system 200. Display component 214 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 216, allowing for a user 120 of computing system 200 to input information to computing system 200. Such information could include payment information such as an amount required to complete a transaction, account information, authentication information such as a credential, or identification information. An input component 216 may include, for example, a keyboard or key pad, whether physical or virtual. Computing system 200 may further include a navigation control component 218, configured to allow a user to navigate along display component 214. Consistent with some embodiments, navigation control component 218 may be a mouse, a trackball, or other such device. Moreover, if device 200 includes a touch screen, display component 214, input component 216, and navigation control 218 may be a single integrated component, such as a capacitive sensor-based touch screen.

Computing system 200 may perform specific operations by processing component 206 executing one or more sequences of instructions contained in system memory component 208, internal memory component 210, and/or external or static memory 212. In other embodiments, hard-wired circuitry may be used in place of or in combination with software instructions to implement the present disclosure. Logic may be encoded in a computer readable medium, which may refer to any medium that participates in providing instructions to processing component 206 for execution. Such a medium may take many forms, including but not limited to, non-volatile media and volatile media. The medium may correspond to any of system memory 208, internal memory 210 and/or external or static memory 212. Consistent with some embodiments, the computer readable medium may be tangible and non-transitory. In various implementations, non-volatile media include optical or magnetic disks and volatile media includes dynamic memory. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 220 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may also include one or more wireless transceivers 222 that may each include an antenna that is separable or integral and is capable of transmitting and receiving information according to one or more wireless network protocols, such as Wi-Fi™, 3G, 4G, HDSPA, LTE, RF, NFC, TFEE 802.11a, b, g, n, ac, or ad, Bluetooth®, BLE, WiMAX, ZigBee®, etc. Computing system 200 may transmit and receive messages, data and one or more data packets, information and instructions, including one or more programs (i.e., application code) through communication link 220 and network interface component 202 and wireless transceivers 222. Received program code may be executed by processing component 206 as received and/or stored in memory 208, 210, or 212.

Figure 3:
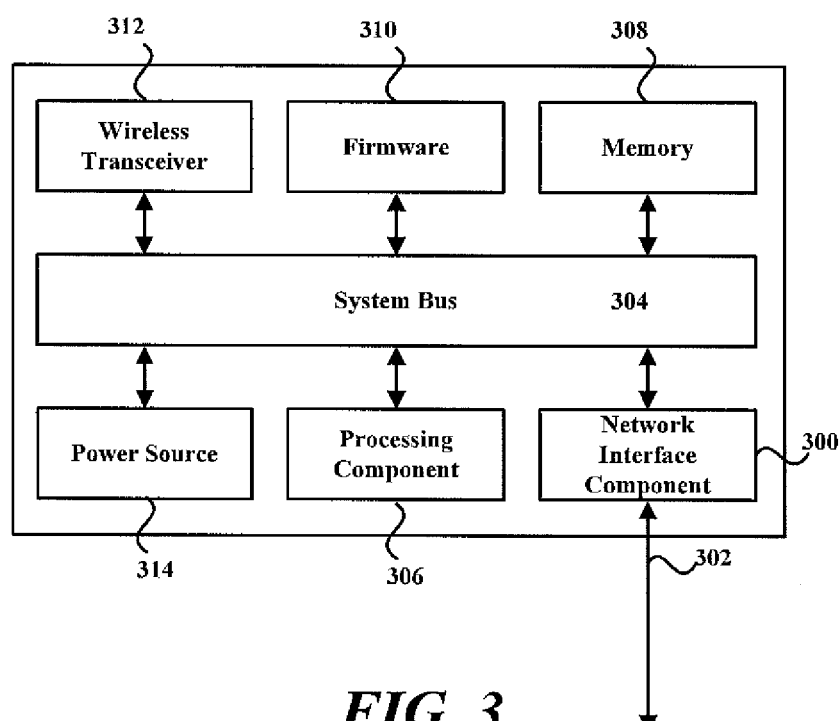
FIG. 3 is a diagram illustrating a beacon, consistent with some embodiments.

FIG. 3 is a diagram illustrating a beacon 108, consistent with some embodiments. As shown in FIG. 3, beacon 108 includes a network interface component (NIC) 300 configured for communication with a network such as network 106 shown in FIG. 1. Consistent with some embodiments, NIC 300 includes a wireless communication component, such as a wireless broadband component, a wireless satellite component, or various other types of wireless communication components including radio frequency (RF), microwave frequency (MWF), and/or infrared (IR) components configured for communication 302 with network 106. Consistent with other embodiments, NIC 300 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Beacon 108 also includes a system bus 304 for interconnecting various components within beacon 108 and communicating information between the various components. Such components include a processing component 306, which may be one or more processors, micro-controllers, graphics processing units (GPUs) or digital signal processors (DSPs), a memory component 308, firmware 310 and one or more wireless transceivers 312 that may each include an antenna that is separable or integral and is capable of transmitting and receiving information according to one or more wireless network protocols, such as Wi-Fi™, 3G, 4G, HDSPA, LTE, RF, NFC, IEEE 802.11a, b, g, n, ac, or ad, Bluetooth®, BLE, WiMAX, ZigBee®, etc. Beacon 108 may also include a power source 314. Power source 314 may be any power source capable of providing sufficient current to power the components of beacon 108. In some embodiments, power source 318 may be a battery, such as a watch battery or button cell.

In some embodiments, beacon 108 may be configured to transmit information using wireless transceivers 312 based on instructions stored in memory 308 and/or firmware 310 executed by processing component 306. The instructions may be stored in memory 308 and/or firmware 310 by directly writing the instructions to memory 308 and/or firmware 310 over communication link 302 to beacon hardware interface 300 or by wirelessly receiving instructions by wireless transceivers 312. In some embodiments, beacon 108 may be configured to transmit information related to checking in to a merchant associated with beacon 108. In some embodiments, the transmitted information may include a packet sequence received from remote server 104 that identifies a particular merchant or location. The packet sequence may include packets having a small size, such as 32 bits, that may include information that may be used to identify the location or merchant. In some embodiments, beacon 108 may also transmit instructions that when received by client computing device 102 may cause check in application 114 or other applications 116 to be executed by processing component 206 to cause client computing device 102 to perform a check in at the merchant or location associated with beacon 108. Further, beacon 108 may transfer instructions that, when received by client computing device 102 to allow user 110 to authorize a payment to be processed by remote server 104. In some embodiments, wireless transceiver 312 may correspond to a BLE transceiver configured to transmit and receive information according to the BLE protocol. In some embodiments, beacon 108 may be a BLE beacon or dongle such as described in U.S. patent application Ser. No. 13/938,860, filed on Jul. 10, 2013, the entire contents of which are hereby incorporated by reference in their entirety. Further, BLE beacon 108 may have a design such as shown in U.S. Design application Ser. No. 29/455,720, filed May 23, 2013, the entire contents of which are also incorporated herein by reference in their entirety.

Figure 4:
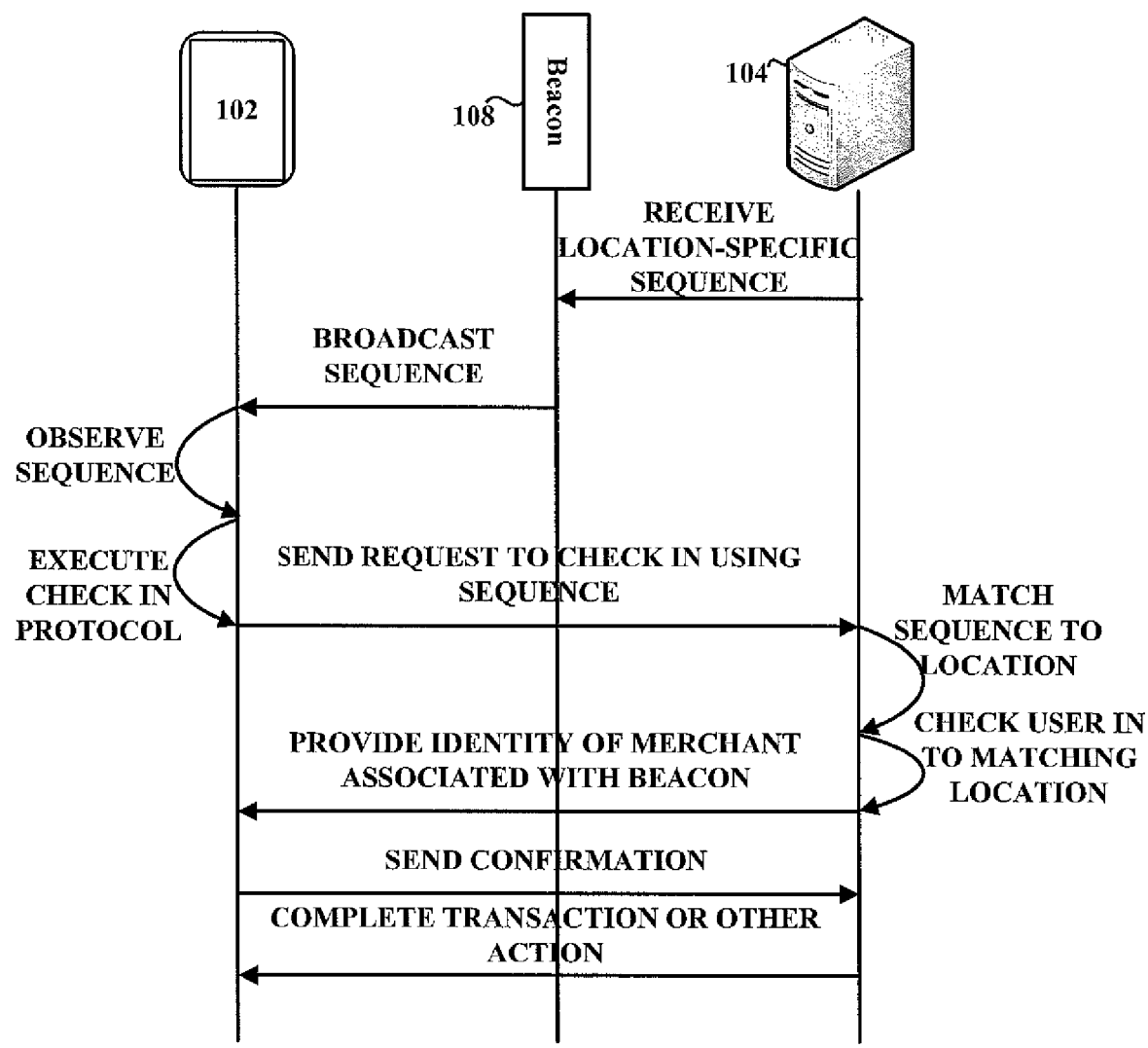
FIG. 4 is a diagram illustrating a flow of checking a user into a location using a specific sequence of packets, consistent with some embodiments.

FIG. 4 is a diagram illustrating a flow of checking a user into a location using a specific sequence of packets, consistent with some embodiments. As shown in FIG. 4, remote server 104 may send to beacon 108 a specific sequence of packets that may be unique to a location where beacon 108 is installed and may be used to identify the location. In some embodiments, the specific sequence of packets may have a small packet size, for example 32 bits, and the packets may include information that identify the location. Beacon 108 may store the sequence in memory 308 and broadcast the sequence when active. When user 110 having client computing device 102 arrives at the location, enters a merchant's store, restaurant, and the like, client computing device 102 may receive and observe the sequence broadcast by beacon 108. User 110 may use client computing device 102 to execute a check in protocol to check in to the location, and send a request to check in to remote server 104 with the request including the received and observed packet sequence. Remote server 104 may then match the received sequence to a store sequence to determine the location and check user 110 into the matching location. In some embodiments, checking user 110 in to the location may allow user 110 to receive special offers and coupons related to the location. In some embodiments, checking user 110 in to the location may allow user 110 to pay for a transaction using a payment processing service such as may be provided by remote server 104 for items that user 110 wants to buy in the location, or to authorize a payment for items that user 110 has already agreed to purchase before entering the location. Moreover, checking in to a location may also provide user 110 with additional options specific to the location, such as previously described. Furthermore, checking in to the location may also provide the location with information about user 110, based on preferences of user 110.

Once remote server 104 has checked user 110 in to the location, remote server 104 may provide an identity of the merchant associated with beacon 108 for user 110 to review to ensure that they are checking in to the desired merchant or location. User 110 may then send a confirmation to remote server 104. When remote server 104 receives the confirmation, any actions associated with the check in may be completed. Such actions may include authorizing payments to a merchant or location, with such payments being processed by remote server 104. Such actions may also include receiving offers, specials, coupons, and the like for use at the merchant or location at which beacon 108 is installed or otherwise associated with.

In some embodiments, to reduce the number of packet sequences needed to cover each location, the packet sequences may correspond to a particular geographic location, such as a square mile, zone improvement plan (ZIP) code, city, country, time zone, and the like. Consequently, for each geographic location, every location or merchant in that geographic location having beacon 108 that may be used to automatically check in user 110 having client computing device 102 has a unique and specific packet sequence. In such embodiments, a global positioning system (GPS) transceiver or other location-determining component in client computing device 102 could be used to determine a fine or rough location of client computing device 102 (and the geographic location of the location or merchant that user 110 is at), and this location could be sent to remote server 104 along with the check in request so that remote server 104 identifies the location for checking in based on the packet sequence and the geographic location. Similarly, other ways of partitioning locations to reduce the number of packet sequences needed may be used. In some embodiments, the flow shown in FIG. 4 may be repeated for each location having beacons 108 that transmit a specific and unique packet sequence such that client computing device 102 may check in to each location based on the received packet sequence.

Figure 5:
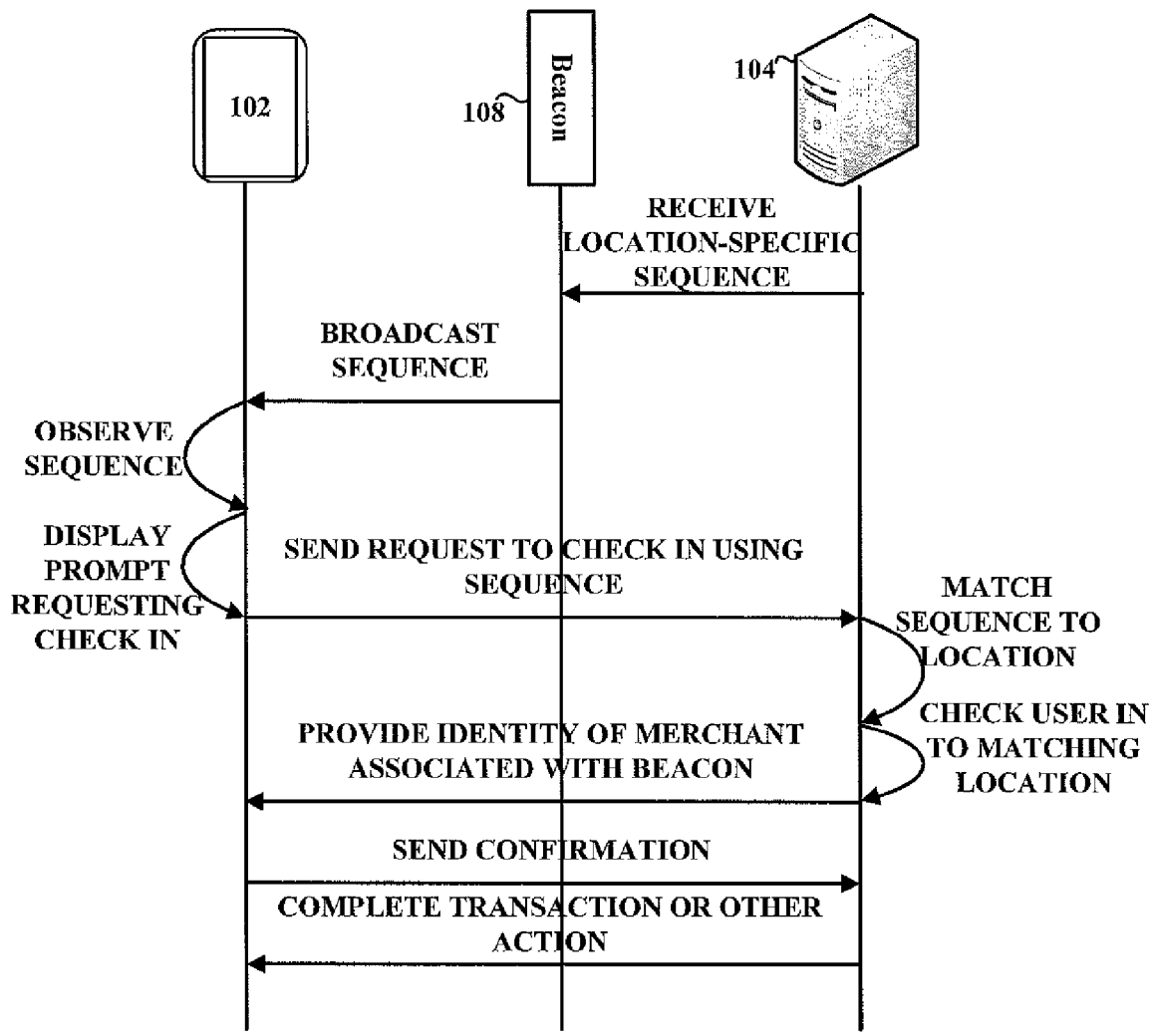
FIG. 5 is a diagram illustrating a flow of checking a user into a location using a specific sequence of packets, consistent with some embodiments.

FIG. 5 is a diagram illustrating a flow of checking a user into a location using a specific sequence of packets, consistent with some embodiments. As shown in FIG. 4, remote server 104 may send to beacon 108 a specific sequence of packets that may be unique to a location where beacon 108 is installed and may be used to identify the location. In some embodiments, the specific sequence of packets may have a small packet size, for example 32 bits, and the packets may include information that identify the location. Beacon 108 may store the sequence in memory 308 and broadcast the sequence when active. When user 110 having client computing device 102 arrives at the location, enters a merchant's store, restaurant, and the like, client computing device 102 may receive and observe the sequence broadcast by beacon 108. User 110 may then be prompted to check in. When user 110 responds to the check in prompt, client computing device 102 may send a request to check in to remote server 104 with the request including the received and observed packet sequence. Remote server 104 may then match the received sequence to a store sequence to determine the location and check user 110 into the matching location. In some embodiments, checking user 110 in to the location may allow user 110 to receive special offers and coupons related to the location. In some embodiments, checking user 110 in to the location may allow user 110 to pay for a transaction using a payment processing service such as may be provided by remote server 104 for items that user 110 wants to buy in the location, or to authorize a payment for items that user 110 has already agreed to purchase before entering the location, or to provide additional location-specific features as well as provide the location with information about user 110.

Once remote server 104 has checked user 110 in to the location, remote server 104 may provide an identity of the merchant associated with beacon 108 for user 110 to review to ensure that they are checking in to the desired merchant or location. User 110 may then send a confirmation to remote server 104. When remote server 104 receives the confirmation, any actions associated with the check in may be completed. Such actions may include authorizing payments to a merchant or location, with such payments being processed by remote server 104. Such actions may also include receiving offers, specials, coupons, and the like for use at the merchant or location at which beacon 108 is installed or otherwise associated with. In some embodiments, the flow shown in FIG. 5 may be repeated for each location having beacons 108 that transmit a specific and unique packet sequence such that client computing device 102 may be prompted to check in to a location in each location based on the received packet sequence.

Figure 6:
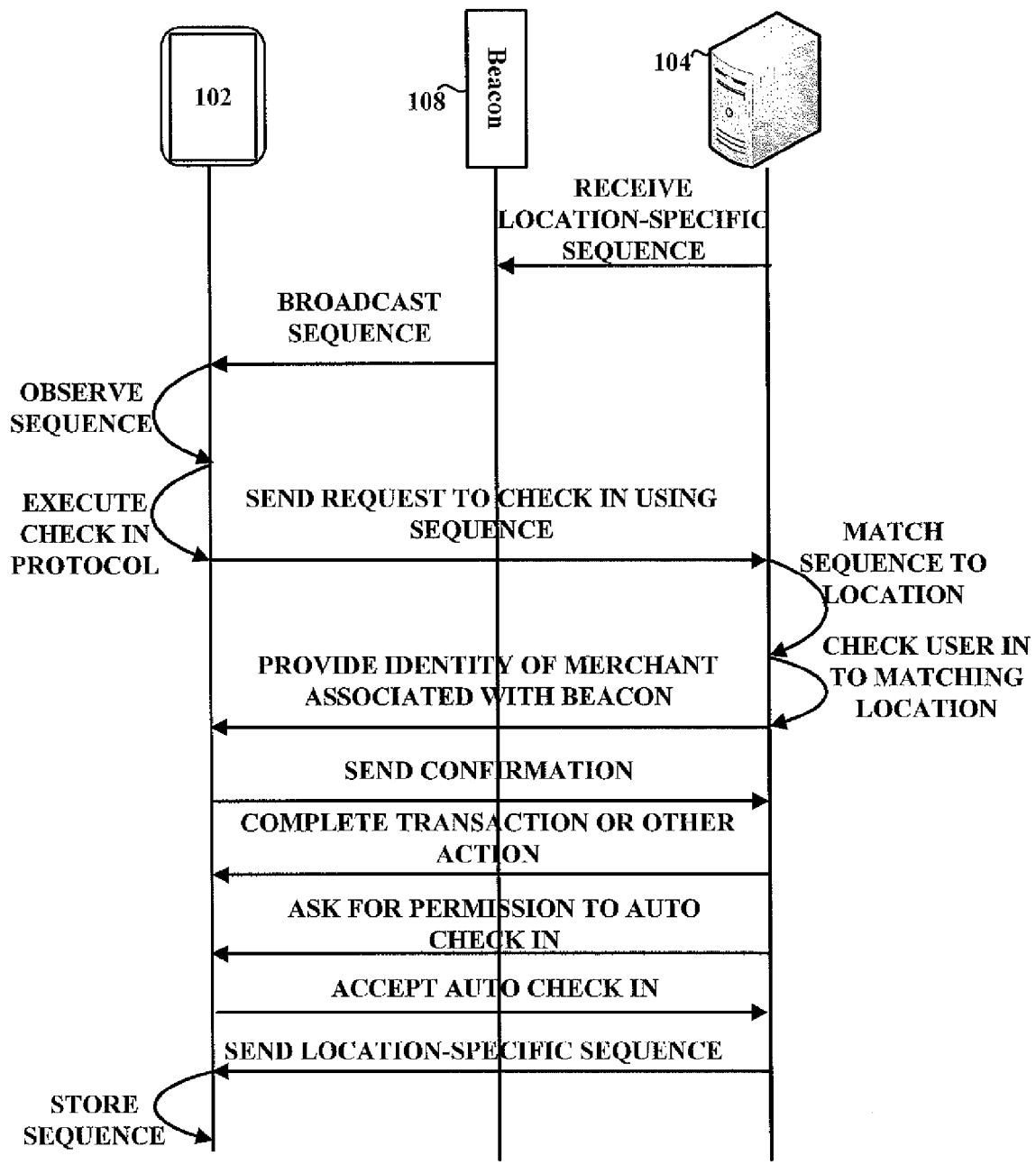
FIG. 6 is a diagram illustrating a flow of automatically checking a user into a location using a specific sequence of packets, consistent with some embodiments.

FIG. 6 is a diagram illustrating a flow of automatically checking a user into a location using a specific sequence of packets, consistent with some embodiments. As shown in FIG. 6, remote server 104 may send to beacon 108 a specific sequence of packets that may be unique to a location where beacon 108 is installed and may be used to identify the location. In some embodiments, the specific sequence of packets may have a small packet size, for example 32 bits, and the packets may include information that identify the location. Beacon 108 may store the sequence in memory 308 and broadcast the sequence when active. When user 110 having client computing device 102 arrives at the location, enters a merchant's store, restaurant, and the like, client computing device 102 may receive and observe the sequence broadcast by beacon 108. User 110 may use client computing device 102 to execute a check in protocol to check in to the location, and send a request to check in to remote server 104 with the request including the received and observed packet sequence. Remote server 104 may then match the received sequence to a store sequence to determine the location and check user 110 into the matching location. In some embodiments, checking user 110 in to the location may allow user 110 to receive special offers and coupons related to the location. In some embodiments, checking user 110 in to the location may allow user 110 to pay for a transaction using a payment processing service such as may be provided by remote server 104 for items that user 110 wants to buy in the location, or to authorize a payment for items that user 110 has already agreed to purchase before entering the location. Moreover, checking in to a location may also provide user 110 with additional options specific to the location, such as previously described. Furthermore, checking in to the location may also provide the location with information about user 110, based on preferences of user 110.

Once remote server 104 has checked user 110 in to the location, remote server 104 may provide an identity of the merchant associated with beacon 108 for user 110 to review to ensure that they are checking in to the desired merchant or location. User 110 may then send a confirmation to remote server 104. When remote server 104 receives the confirmation, any actions associated with the check in may be completed. Such actions may include authorizing payments to a merchant or location, with such payments being processed by remote server 104. Such actions may also include receiving offers, specials, coupons, and the like for use at the merchant or location at which beacon 108 is installed or otherwise associated with. Remote server 104 may then send client computing device 102 a message requesting permission for automatically checking user 110 in whenever user 110 is at the location. When user 110 accepts or enrolls in an automatic check in, remote server 104 may send the specific sequence of packets that correspond to the location to client computing device 102. Client computing device 102 may then store the specific sequence of packets in any of memory 208-212. Consequently, the next time user 110 having client computing device 102 arrives at or enters the same location, when client computing device 102 receives the specific sequence of packets sent by beacon 108, processing component 206 of client computing device 102 may match the received sequence to the specific sequence stored in any of memories 208-212 and automatically execute a check in protocol to send a check in request to remote server 104 when the received sequence matches the stored sequence. In some embodiments, the flow shown in FIG. 6 may be repeated for each location having beacons 108 that transmit a specific and unique packet sequence such that any of memories 208-212 of client computing device 102 may store a specific and unique sequence for each location enabling user 110 having client computing device 102 to automatically check in to each location based on the received packet sequence.

Figure 7:
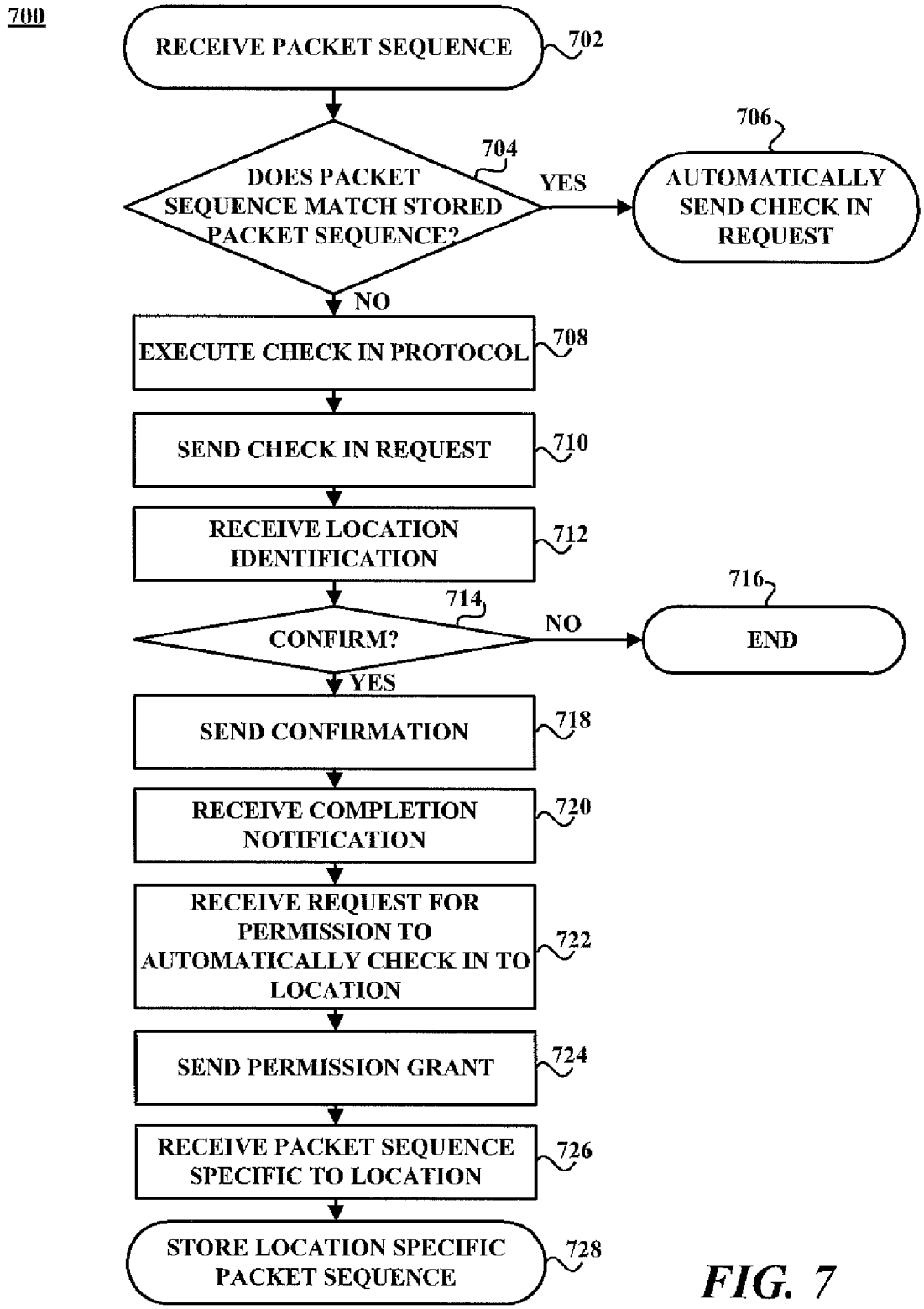
FIG. 7 is a flowchart illustrating a process for checking in to a location using a specific sequence of packets, consistent with some embodiments.

FIG. 7 is a flowchart illustrating a process 700 for checking in to a location using a specific sequence of packets, consistent with some embodiments. For the purpose of illustration, FIG. 7 may be described with reference to any of FIGS. 1-6. Process 700 may be embodied in computer-readable instructions for execution by one or more processors such that the steps of process 700 may be performed by client computing device 102. In some embodiments, check in application 114 of client computing device 102 may include instructions for performing one or more steps of process 700. As shown in FIG. 7, process 700 may begin when client computing device 102 receives a packet sequence (702). In some embodiments user 110 having client computing device 102 may arrive at a location, enter a merchant's store, restaurant, and the like having a beacon 108, and client computing device 102 may receive a packet sequence from beacon 108. In some embodiments, the packet sequence may comprise a sequence of packets having a small packet size which, in some embodiments, may be 32 bits, having a predetermined time therebetween, the packets including information specific to the location that may be used to identify the location. In some embodiments, the packet sequence may include instructions that, when executed by processing component 206 of client computing device 102 may cause processing component 206 to perform an action.

When processing component 206 determines that the received packet sequence matches a stored packet sequence (704), network interface component 202 of client computing device 102 may execute a check in protocol and send a check in request (706). When processing component 206 determines that the received packet sequence does not match a stored packet sequence, client computing device 102 may execute a check in protocol (708) and send a check in request (710). In some embodiments, the packet sequence may have instructions that may be executed by processing component 206 of client computing device 102 and may cause client computing device 102 to perform an action, such as executing a check in protocol, sending a check in request, and/or executing check in application 114. In some embodiments, the check in request may be sent to remote server 104. Client computing device 102 may receive an identification of the location that they are checking in to (712), allowing user 110 to confirm or deny the check in request. When user does not confirm the location to which they are attempting to check in, process 700 may terminate or end (716). When user 110 confirms the location, client computing device 102 may send a confirmation (718) to remote server 104. Client computing device 102 may then receive a notification that an action has been completed (720). In some embodiments, the completed action may be a successful check in, and/or the authorization of a payment, completion of a transaction, a receipt of an offer, and the like. Moreover, the completed action may be additional location-specific features, such as previously described.

After the action has been completed, client computing device 102 may receive a request for permission to automatically check in at the location on future visits (722). When user 110 grants permission client computing device 102 may send a permission grant (724). Client computing device 102 may then receive a packet sequence that is specific to that location (726) and store the location specific packet sequence in one of memories 208-212 (728). Consequently, the next time user 110 visits that location with client computing device 102 user may receive a packet sequence from beacon 108 (702) and automatically execute a check in protocol and send a check in request (706). In some embodiments, beacon 108 as referred to with respect to process 700 may refer to a BLE beacon. Moreover, information sent from and received at client computing device 102 in process 700 may be information sent in response to instructions executed by processing component 206 and sent from and received by at least one of network interface component 202 and wireless transceiver 222.

Figure 8:
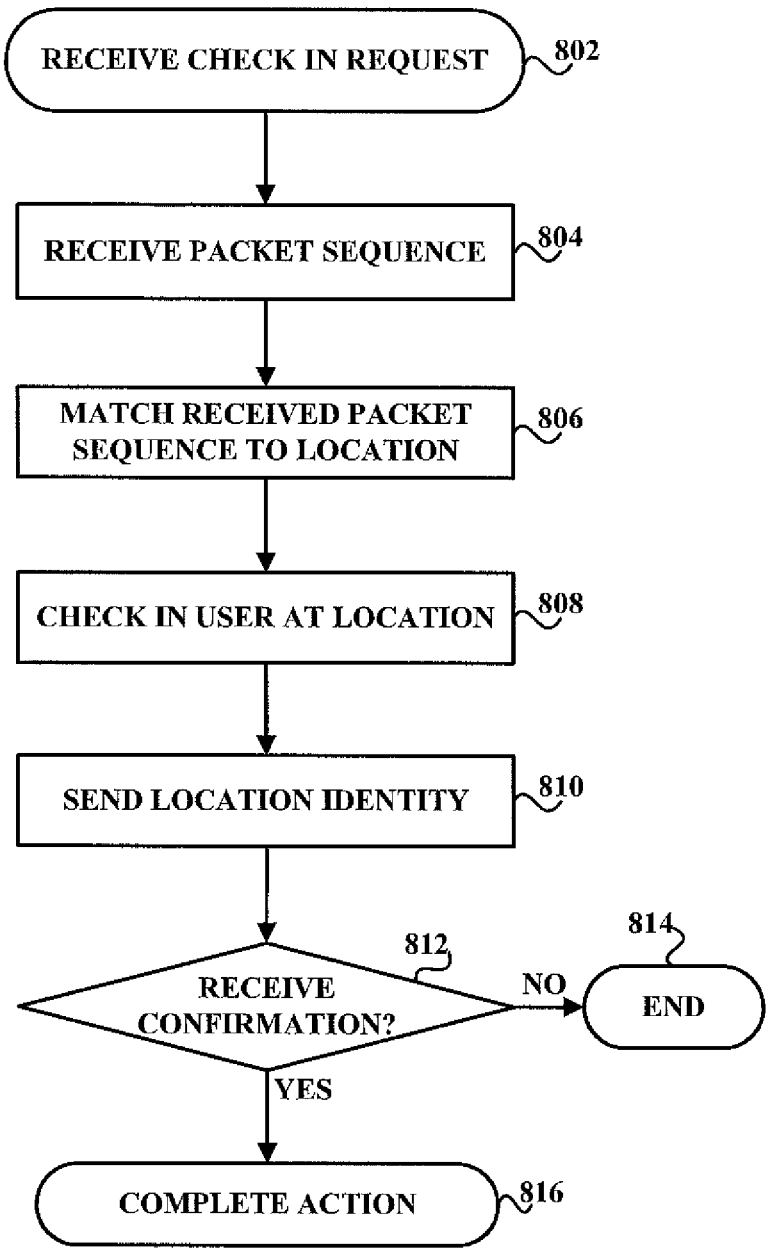
FIG. 8 is a flowchart illustrating a process for checking user in to a location using a specific sequence of packets, consistent with some embodiments.

FIG. 8 is a flowchart illustrating a process 800 for checking user 110 in to a location using a specific sequence of packets, consistent with some embodiments. For the purpose of illustration, FIG. 8 may be described with reference to any of FIGS. 1-6. Process 800 may be embodied in computer-readable instructions for execution by one or more processors such that the steps of process 800 may be performed by remote server 104. In some embodiments, check in application 118 of remote server 104 may include instructions for performing one or more steps of process 800. As shown in FIG. 8, process 800 may begin when remote server 104 receives a check in request (802). In some embodiments, the check in request may be received from client computing device 102 and may be a request to check user 110 in to a particular location. In some embodiments, the check in request may include a specific sequence of packets that may also be received along with the check in request from client computing device 102 (804). In some embodiments, the packet sequence may comprise a sequence of packets having a small packet size, for example 32 bits, having a predetermined time therebetween that may be unique to a predetermined time or location or used to identify a particular location. The packet sequence may also include information in the packets that are specific to the location and may be used to identify the location.

Processing component 206 of remote server 106 may attempt to match the received packet sequence to a particular location (806) and check user 110 in to the location based on a matching packet sequence (808). In some embodiments, particular locations may have a packet sequence that identifies that particular location and may be saved in account database 120 and/or databases 126. Processing component 206 may attempt to match the received packet sequence to one of the saved locations and check user 110 in to the matching location. Remote server 104 may then send an identity of the location or merchant for confirmation purposes (810). When remote server 104 does not receive a confirmation, process 800 may end or terminate (814). When remote server 104 receives a confirmation, remote server 104 may complete an action (816). In some embodiments, completing an action may include processing a payment or authorizing a payment, checking user 110 in to the location or merchant, or sending an offer and the like to client computing device 102. Information sent from and received at remote server 104 in process 800 may be information sent in response to instructions executed by processing component 206 and sent from and received by at least one of network interface component 202 and wireless transceiver 222.

Figure 9:
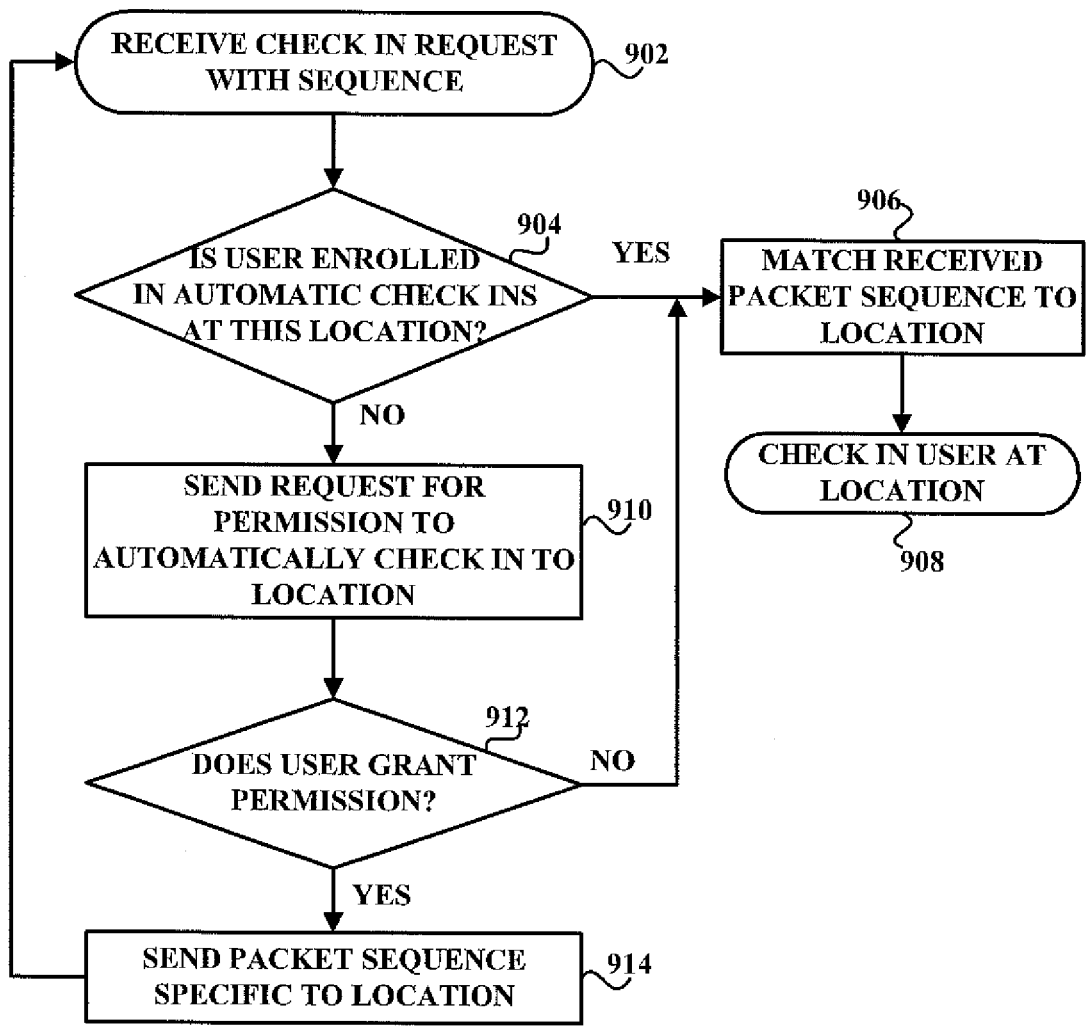
FIG. 9 is a flowchart illustrating a process for automatically checking user in to a location using a specific sequence of packets, consistent with some embodiments.

FIG. 9 is a flowchart illustrating a process 900 for automatically checking user 110 in to a location using a specific sequence of packets, consistent with some embodiments. For the purpose of illustration, FIG. 9 may be described with reference to any of FIGS. 1-6. Process 900 may be embodied in computer-readable instructions for execution by one or more processors such that the steps of process 900 may be performed by remote server 104. In some embodiments, check in application 118 of remote server 104 may include instructions for performing one or more steps of process 900. As shown in FIG. 9, process 900 may begin when remote server 104 receives a check in request (902). In some embodiments, the check in request may be received from client computing device 102 and may be a request to check user 110 in to a particular location. The request may also include a specific packet sequence that may be unique to that particular location or otherwise may include information that may be used to identify the location. Remote server 104 may then determine if user 110 is enrolled in automatic check ins at this location (904). In some embodiments, user 110 may grant permission to be automatically checked in to one or more locations. When user 110 is already enrolled in automatic check ins at the location, remote server 104 may proceed to match the received packet sequence to a specific location (906) and check user 110 in at the location (908).

However, when user is not automatically enrolled in automatic check ins at this location (904) remote server 104 may send a request for permission to automatically check in at the location (910). When user does not grant permission (912) remote server 104 may proceed to match the received sequence to the particular location (906) and check user 110 in at the location (908). However, when user 110 grants permission and enrolls in automatic check ins at the location, remote server 104 may send a specific packet sequence to client computing device 102 (914). In some embodiments, the packet sequence may comprise a sequence of packets having a small packet size which, in some embodiments, may be 32 bits, having a predetermined time therebetween, and may include instructions for execution by processing component of client computing device 102. The packet sequence may also include information in the packets that is specific to the location and may be used to identify the location. Moreover, the packet sequence may be stored by client computing device 102 and may be used to automatically check in at a location, as the packet sequence may match a packet sequence transmitted by a BLE beacon 108 at that location. Information sent from and received at remote server 104 in process 900 may be information sent in response to instructions executed by processing component 206 and sent from and received by at least one of network interface component 202 and wireless transceiver 222.

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide systems and methods for automatically checking a user in to a location using a packet sequence sent by a BLE beacon that is unique to the location and/or identifies the location. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system comprising:
a non-transitory memory;
one or more hardware processors coupled to the non-transitory memory and configured to read instructions from the non-transitory memory to cause the system to perform operations comprising:
receiving a timed sequence of packets, the timed sequence of packets having been transmitted by a beacon using a Bluetooth® low energy (BLE) protocol;
matching the timed sequence of packets to a location, wherein the matching is based at least in part on times between receiving consecutive packets in the timed sequence of packets, the times between receiving consecutive packets being unique to the location; and
checking a user into the matching location.

2. The system of claim 1, wherein each of the packets in the timed sequence of packets has a size of 32 bits or less.

3. The system of claim 1, wherein each of the packets in the timed sequence of packets comprises instructions for execution by the one or more hardware processors.

4. The system of claim 3, wherein the instructions comprise instructions for checking the user into the matching location.

5. The system of claim 1, wherein matching the timed sequence of packets to the location comprises matching the timed sequence of packets to a second timed sequence of packets stored in the memory.

6. The system of claim 1, wherein checking the user into the matching location comprises transmitting, to a client computing device, an identity of the matching location.

7. The system of claim 1, wherein checking the user into the matching location comprises transmitting, to a client computing device, a third timed sequence of packets.

8. A method comprising:
  receiving, by one or more hardware processors, a timed sequence of packets, the timed sequence of packets having been transmitted by a beacon using a Bluetooth® low energy (BLE) protocol;
  matching the timed sequence of packets to a location, wherein the matching is based at least in part on times between receiving consecutive packets in the timed sequence of packets, the times between receiving consecutive packets being unique to the location; and
  checking a user into the matching location.

9. The method of claim 8, wherein each of the packets in the timed sequence of packets has a size of 32 bits or less.

10. The method of claim 8, wherein each of the packets in the timed sequence of packets comprises instructions for execution by the one or more hardware processors.

11. The method of claim 10, wherein the instructions comprise instructions for checking the user into the matching location.

12. The method of claim 8, wherein the timed sequence of packets is received along with a check in request.

13. The method of claim 8, wherein checking the user into the matching location comprises transmitting, to a client computing device, a third timed sequence of packets.

14. A non-transitory machine-readable medium having stored thereon machine-readable instructions executable to cause a machine to perform operations comprising:
  receiving a timed sequence of packets, the timed sequence of packets having been transmitted by a beacon using a Bluetooth® low energy (BLE) protocol;
  matching the timed sequence of packets to a location, wherein the matching is based at least in part on times between receiving consecutive packets in the timed sequence of packets, the times between receiving consecutive packets being unique to the location; and
  checking a user into the matching location.

15. The machine-readable medium of claim 14, wherein each of the packets in the timed sequence of packets has a size of 32 bits or less.

16. The machine-readable medium of claim 14, wherein each of the packets in the timed sequence of packets comprises instructions for execution by one or more processors of a client computing device.

17. The machine-readable medium of claim 16, wherein the instructions comprise instructions for checking the user into the matching location.

18. The machine-readable medium of claim 16, wherein the timed sequence of packets is received along with a check in request.

19. The machine-readable medium of claim 14, wherein checking the user into the matching location comprises transmitting, to a client computing device, a third timed sequence of packets.

20. The machine-readable medium of claim 14, wherein checking the user into the matching location comprises transmitting, to a client computing device, an identity of the matching location.

* * * * *